(12) United States Patent
Bade et al.

(10) Patent No.: US 6,898,628 B2
(45) Date of Patent: May 24, 2005

(54) SYSTEM AND METHOD FOR PROVIDING POSITIONAL AUTHENTICATION FOR CLIENT-SERVER SYSTEMS

(75) Inventors: Steven A. Bade, Georgetown, TX (US); Robert H. LeGrand, III, Austin, TX (US); Mark-David J. McLaughlin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 09/815,549

(22) Filed: Mar. 22, 2001

(65) Prior Publication Data

US 2002/0138632 A1 Sep. 26, 2002

(51) Int. Cl.[7] ............................................. G06F 15/16
(52) U.S. Cl. ........................ 709/217; 709/218; 709/219
(58) Field of Search ............................... 709/217, 218, 709/219, 228, 229, 203

(56) References Cited

U.S. PATENT DOCUMENTS

| | | | | |
|---|---|---|---|---|
| 5,757,916 A | * | 5/1998 | MacDoran et al. | 380/258 |
| 6,247,059 B1 | * | 6/2001 | Johnson et al. | 709/237 |
| 6,343,317 B1 | * | 1/2002 | Glorikian | 709/218 |
| 6,370,629 B1 | * | 4/2002 | Hastings et al. | 711/163 |
| 6,661,372 B1 | * | 12/2003 | Girerd et al. | 342/357.12 |
| 2001/0032236 A1 | * | 10/2001 | Lin | 709/203 |

* cited by examiner

Primary Examiner—Krisna Lim
(74) Attorney, Agent, or Firm—Diana L Roberts; Edmond A. Defrank

(57) ABSTRACT

The present invention is embodied in a system and method for providing positional authentication for client-server systems, such as extranets. In general, an authentication system of the present invention controls and authenticates access rights to a host server from a client machine that desires access to the host server via a network connection, such as an extranet connection. Specifically, the present invention includes a client machine coupled to a host server, via any suitable connection, such as an extranet, and a wireless positioning system, such as a global positioning satellite (GPS). The client machine can be any suitable client computer machine, such as a desktop computer, portable notebook computer or the like. The client machine includes a positioning receiver and a positional relation module. The host server includes an authentication module with predefined access parameters for standard and positional authentication. A portion of the predefined access parameters is used to associate specific locations of the client machine with access rights for positional authentication.

20 Claims, 3 Drawing Sheets

SYSTEM AND METHOD FOR PROVIDING POSITIONAL AUTHENTICATION FOR CLIENT-SERVER SYSTEMS

BACKGROUND OF THE INVENTION

1. Field of the Invention

The present invention relates in general to client-server systems and in particular to a system and method for providing positional authentication for client-server systems.

2. Related Art

Computer networks are common and vitally important in many diverse applications including business, universities and government. In general, a computer network is two or more computers (or associated devices) that are connected by communication facilities. A computer network generally includes a server, which is a computer that provides shared resources to users of the network, and a client, which is a computer that accesses the shared network resources provided by the server using the communication facilities. This type of system is commonly referred to as a client-server system.

There are several popular client-server systems that are used in current networking environments. Some examples include intranet networking environments and the Internet. An intranet is usually a private local area network (LAN) environment. Intranets are very popular with both small and large companies and are becoming popular with home networking environments. The Internet is a public wide-area network (WAN) environment. One of the fastest growing aspects of the Internet is the World Wide Web (WWW). This is because the WWW allows the dissemination of mass media to large amount of people. Both intranets and the Internet enable remote clients to request and receive data located on a server.

Another type of server-client system is an extranet. An extranet is an intranet that is partially accessible to authorized outsiders. However, extranets are generally set up on the Internet. Hence, an extranet networking environment, with relation to access, falls somewhere between an intranet network and the Internet. This is because the Internet allows public data access, while intranets usually reside behind firewalls and typically are local and only allow data access to specific groups or members of the same company or organization. In contrast, an extranet can operate in a LAN or WAN environment and can provide various levels of accessibility to any person. For example, many extranets allow data access if a person has a valid username and password, and the person's identity determines which parts of the extranet that person can view. As such, extranets are becoming very popular for allowing business partners and customers to exchange and access information located on a server system. However, when the Internet is used as a basis for an extranet, such as World Wide Web pages acting as software distribution points with virtual private networking (VPN) technologies, security can be compromised if location is an important access constraint.

Further, real-time positional systems access coordinate position data from various sources, such as local transmitters or satellites, and are becoming more and more popular. These systems include GPS (Global Position Satellites), MLS (Microwave Landing Systems), GSM (Global System Mobile), GIS (Geographical Information Systems) and CPS (Cambridge Positioning Systems) and have been recently incorporated into personal computers, electronic mobile devices and automobiles. However, limited uses are available for these positioning technologies. For instance, these systems are used to primarily support mobile mapping applications for recreational uses, such as driving directions, camping and hiking.

As such, there are limited applications available that combine both the versatility of computing devices with the capabilities of real-time positioning systems. Namely, current systems lack the power to provide a server system with secure protection from an unauthorized client user based on the location of the client user. In one example, access by client users, such as client-server extranets, to a particular server system is the same in all areas where the actual access is granted to the client users, even if the access is not intended for a certain area.

Therefore, what is needed is a system and method for providing access to client-server extranets based on positional data. What is further needed is a system and method that that automatically and dynamically locates position, matches data to position and automatically relays modified data to the client machine for authenticating and controlling access rights to an extranet connected to the client machine. What is also needed is a system and method that automatically prevents unauthorized access to the extranet based on locations where access is not allowed on the client machine.

SUMMARY OF THE INVENTION

To overcome the limitations in the prior art described above, and to overcome other limitations that will become apparent upon reading and understanding the present specification, the present invention is embodied in a system and method for providing positional authentication for client-server systems, such as extranets. In general, an authentication system of the present invention controls and authenticates access rights to a host server from a client machine that desires access to the host server via a network connection, such as an extranet connection.

Specifically, the present invention includes a client machine coupled to a host server, via any suitable connection, such as an extranet, and a wireless positioning system, such as a global positioning satellite (GPS). The client machine can be any suitable client computer machine, such as a desktop computer, portable notebook computer or the like. The client machine includes a positioning receiver and a positional relation module. The host server includes an authentication module with predefined access parameters for standard and positional authentication. A portion of the predefined access parameters is used to associate specific locations of the client machine with access rights for positional authentication.

Before or during the start-up or the login process of the client machine to the host server, the positioning receiver receives positional data from the wireless positioning system indicating the client machine's position. When the client machine requests access to the host server, the machine's positional data is transmitted to the host server. Next, the authentication module performs standard authentication and then additionally performs positional authentication to determine whether access should be granted or denied, or requires a special password. The positional authentication is based on the predefined access parameters. This can be accomplished since the client machine is automatically and dynamically located by the positioning receiver.

This configuration can automatically prevent unauthorized access where access is not allowed or can regulate different levels of access to the host server based on different locations. Software running on the host server can be preprogrammed with access parameters that define the access rights of client machines located throughout the world. Therefore, access rights to the host server can be automatically provided, limited or denied, depending on the predefined access parameters and the location of the client machine at the time access is requested.

The present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. General Overview of the Components

Figure 1:
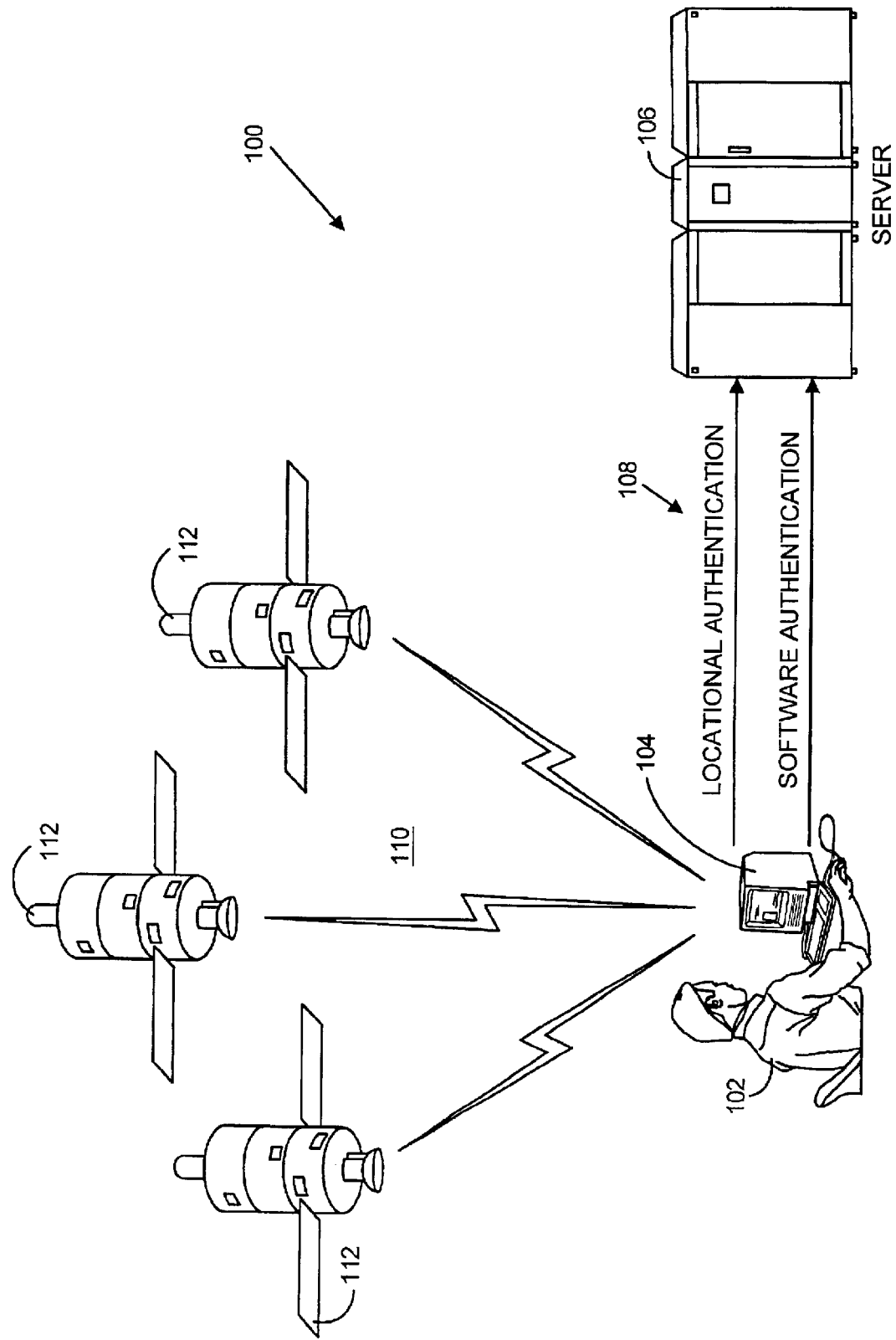
FIG. 1 is a general block diagram showing an overview of the present invention.

FIG. 1 is a general block diagram showing an overview of the present invention. The system 100 includes a user 102 that uses a remote client 104 that is connected to a host server 106 via any suitable connection 108. The connection 108 between the remote client 104 and the host server 106 forms a networking environment or extranet that preferably operates in a LAN or WAN environment and can provide various levels of accessibility. Access from the remote client 104 to the host server 106 includes two layers of authentication, standard authentication (any suitable standard authentication method can be used, including typical methods that require logins with encrypted and secret usernames and passwords) and positional authentication, which will be discussed in detail below.

The system 100 also includes a positioning system 110 that includes at least one transmitter 112, such as a positioning satellite. The positioning system 110 can be any suitable positional access system, such as satellite, microwave, infrared, or radio based, which provides positional access with any suitable method, for example triangulation. The number of transmitters 112 in the transmitter system 110 can be determined based on the number required to obtain a clear view for triangulation. The mobile device 104 has a special a receiver that is capable of receiving a signal from the positioning system 110.

Most types of positional access systems pinpoint location through triangulation. With triangulation, a receiver gathers information from several transmission sources. One type of triangulation is three dimensional (3D) triangulation, which provides latitudinal, longitudinal and elevational coordinates to the receiver. As such, 3D triangulation requires plural transmitters and a predefined coordinate system. For instance, GPS systems typically use 12 satellite transmitters. In the GPS system, a clear view is usually required to allow a receiver to receive a signal from four or more transmitters so that the coordinates of the receiver can be located. Once the coordinates are determined, the specific location can be shown as coordinates or illustrated on an associated electronic map that relates to the actual coordinates.

Figure 2:
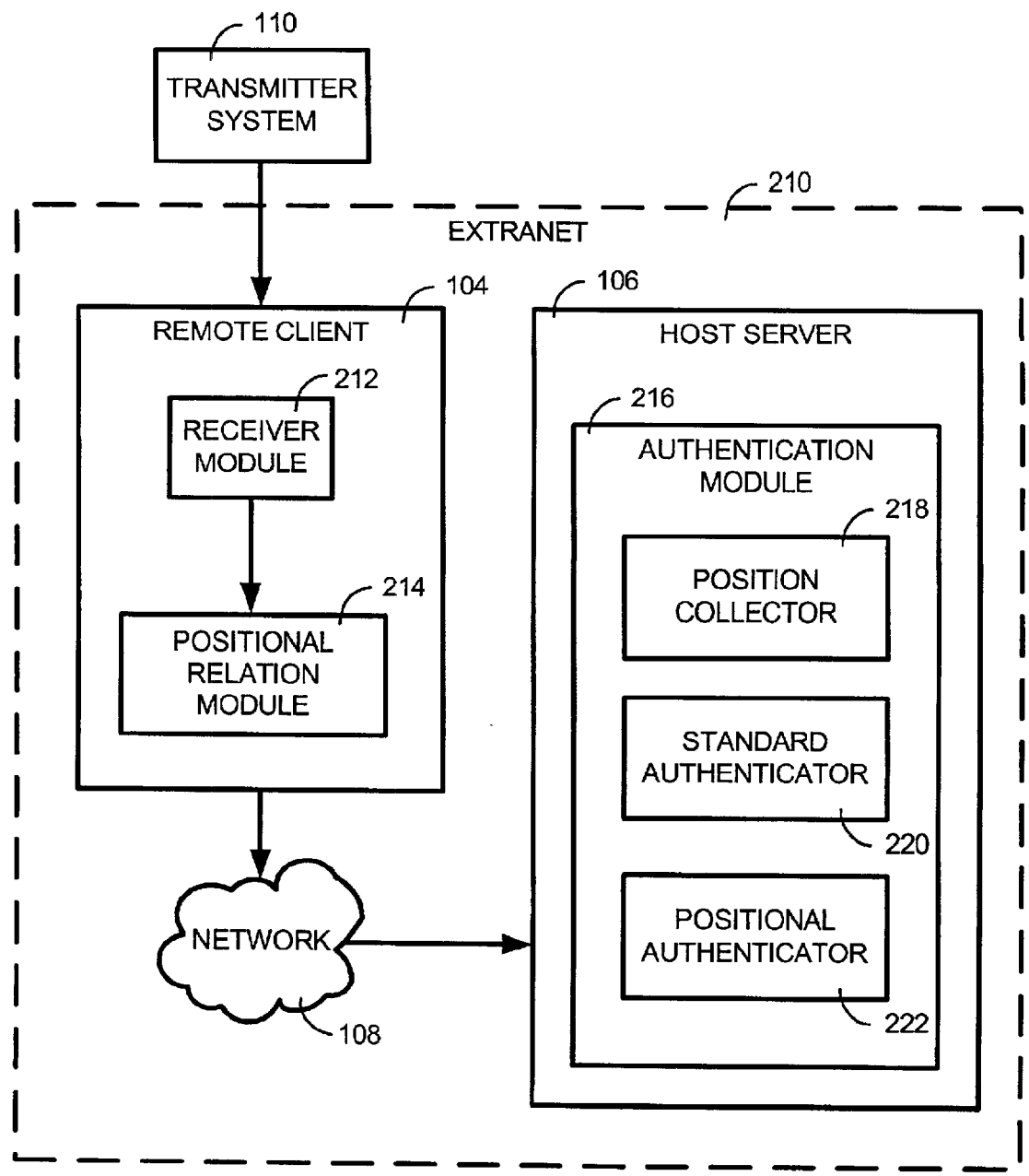
FIG. 2 is a block diagram illustrating the components of the present invention.

FIG. 2 is a block diagram illustrating the components of the present invention. Referring to FIG. 2 along with FIG. 1, the remote client 104 can be any suitable client machine computer, such as a desktop or notebook computer or similar smaller device. The remote client 104 accepts user input from a user 102 and can be interconnected to the host server 106 through any suitable network connection 108, such as the Internet. As discussed above, the connection 108 between the remote client 104 and the host server 106 forms a networking environment or extranet 210. The extranet 210 can use any suitable technology, such as virtual private networking (VPN) technologies.

The remote client 104 includes a receiver module 212 or positional access module that is configured to receive data from the transmitter system 110. The remote client 104 also includes a positional relation module 214 that receives the data and translates the data into positional data for accurately locating the position of the client machine 104. The positional relation module 214 can be a software application running on the remote client 104 that translates the data into latitudinal, longitudinal and elevational coordinates or map locations such as street addresses or city locations.

The host server 106 includes an authentication module 216 that is configured to receive data from the remote client 104 and process this data with a position collector 218, a standard authenticator 220 and a positional authenticator 222. The authentication module 216 controls and authenticates access rights to the host server 106 based on predefined access parameters set by operators or network administrators of the host server 106. A portion of the predefined access parameters is used to associate specific locations of the remote client 104 with access rights for positional authentication.

II. Details of the Components and Operation

Figure 3:
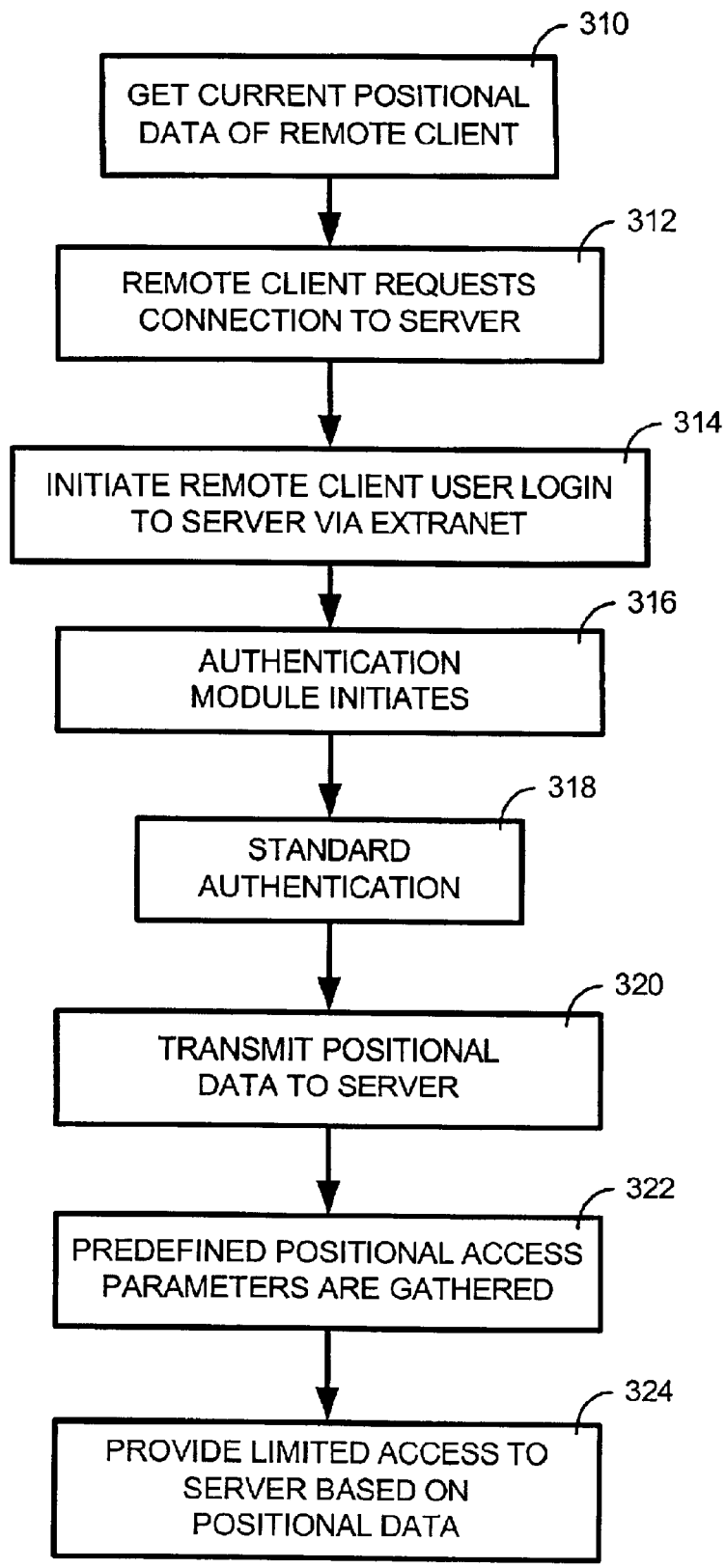
FIG. 3 is a flow chart illustrating operational details of the present invention.

FIG. 3 is a flow chart illustrating operational details of the present invention. Referring to FIGS. 1–2 along with FIG. 3, first, before or during the start-up or the login process of the remote client 104 to the host server 106, the receiver module 212 receives positional data from the wireless positioning system indicating the remote client's position (step 310). The receiver module 212 receives data from the transmitter system 110 and the relation module determines its location based on coordinates received, for example through triangulation. As such, specific positional location data of the remote client 104 is determined, namely, latitudinal, longitudinal and elevational coordinates. The specific positional data can also be provided to the user 102 of the remote client 104 for raw positional data use.

Second, the remote client 104 requests a connection or access to the host server 106 (step 312). Third, remote client user login to the host server 106 via the extranet 210 is initiated (step 314). Fourth, the authentication module 216 of the host server 106 is initiated (step 316). Fifth, the host server 106 performs standard authentication of the remote client (step 318). Any suitable standard authentication method can be used, including typical methods that require logins with encrypted and secret usernames and passwords or methods that user IP addresses and passwords. Sixth, if the remote client 104 is authenticated, the remote client's positional data is transmitted to the host server 106 (step 320).

Next, the host server 106 performs positional authentication to determine whether access should be granted or denied, and if granted, what level of access is allowed and whether an additional or special password is required. The authentication module 216 checks the position of the remote client 104 to see what type or level of access is to be allowed based on the predefined access parameters. Namely, this is accomplished by first gathering predefined positional access parameters (step 322) and then analyzing the position of remote client 104 and associating it with the predefined access parameters to provide, limit or restrict access to the host server 106 (step 324). This authentication is possible since the positioning receiver automatically locates the remote client.

This extranet configuration 210 can automatically prevent unauthorized access where access is not allowed or can regulate different levels of access to the host server 106 based on where the remote client 104 is located. Software running on the host server 106 can be preprogrammed with the access parameters that define the access rights of remote clients 104 based on standard authentication and positional location for providing and restricting access throughout the world. Therefore, access rights to the host server 106 can be automatically provided, limited or denied, depending on the predefined access parameters and the location of the remote client 104 at the time access to the host server 106 is requested.

Basically, the administrator of the host server 106 can define which locations are allowed access and what type or level of access, if any. For instance, an administrator of a host server that contains sensitive and secure data for numerous users located throughout a country, such as the Social Security Office, can restrict access by location with the present invention. This would enable the host server to allow access based on the actual residence of the remote client and relate it to the records on file with the Social Security Office, which adds an additional layer of security to prevent unauthorized access by unscrupulous thieves trying to gain access to someone's social security information.

Also, as another example, when the Internet is used as the basis for an extranet, such as World Wide Web pages acting as software distribution points with VPN technologies, security can be compromised if location is an important access constraint. In one example, if a World Wide Web page provides software that uses source code containing controlled encryption technology, the administrator of the host server would be required to take active steps to prevent use of the controlled encryption technology outside of the non-export areas. With the present invention, unauthorized use and access to the software based on location could be controlled. In addition, software licensing can be controlled by having the authentication data include the normal read, write, execute, create, delete commands, with the positional data used in determining the values of each method in accordance with the present invention.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for automatically controlling access of an Internet site from a remote client to a host server that has predefined access parameters, comprising:
   determining an actual location of the remote client defined by a post office address; and
   using the actual location of the remote client to automatically control and regulate different levels of access to the host server based on the predefined access parameters and if the post office address of the remote client matches a post office address on file at the host server associated with the particular Internet site that the remote client is attempting to access.

2. The method of claim 1, further comprising controlling access to certain levels of data on the host sever based on the remote client's actual location.

3. The method of claim 1, wherein the actual location of the remote client is determined by a global positioning satellite system.

4. The method of claim 1, further comprising using triangulation to determine the actual location of the remote client.

5. The method of claim 4, further comprising using three dimensional triangulation to provide latitudinal, longitudinal and elevational data to the remote client.

6. The method of claim 1, wherein the host server and the remote client operate in a networking environment.

7. The method of claim 1, wherein the networking environment is an extranet using a virtual private network with the Internet as the network communication channel.

8. The method of claim 1, wherein using the actual location of the remote client to automatically control access includes automatically preventing unauthorized access of data on the host server based on locations where access is not likely to occur by the remote client.

9. A tracking system for automatically controlling access from a remote client to an Internet site of a host server that has predefined access parameters, comprising:
   a positioning device that determines an actual location of the remote client defined by a post office address; and
   a control module that uses the location of the remote client to automatically control and regulate different levels of access to the host server based on the predefined access parameters and if the post office address or the remote client matches a post office address on file at the host server associated with the particular Internet site that the remote client is attempting to access.

10. The tracking system of claim 9, wherein the control module controls access to certain operational interfaces of the host server based on its actual location.

11. The tracking system of claim 9, wherein the actual location of the remote client is determined by a global positioning satellite system.

12. The tracking system of claim 9, further comprising controlling access to certain predefined types of data on the host sever based on the remote client's actual location.

13. The tracking system of claim 9, wherein the control module automatically prevents unauthorized access of predefined data on the host server based on locations where access is not likely to occur by the remote client.

14. The tracking system of claim 9, wherein the positioning device receives data from a transmitter system that uses triangulation to determine the actual location of the remote client.

15. The tracking system of claim 14, wherein the transmitter system uses three dimensional triangulation to provide latitudinal, longitudinal and elevational data to the remote client.

16. The tracking system of claim 9, wherein the remote client is a personal computer connected to an extranet via the Internet and a virtual private network.

17. The tracking system of claim 9, wherein when plural remote clients attempt access to the host server from respective various locations, access to the host server by each remote client is automatically at least one of provided, denied or qualified, depending on the predefined access parameters and the location of each remote client at the time access is requested.

18. A computer-readable medium having computer-executable instructions for performing a process between a remote client and a host server having predefined access parameters, comprising:

determining an actual location of the remote client defined by a post office address; and using the actual location of the remote client to automatically control access to an Internet site via the host server based on the predefined access parameters and if the post office address of the remote client matches a post office address on file at the host server associated with the particular Internet site that the remote client is attempting to access.

19. The process of claim 18, wherein using the actual location of the remote client to automatically control access includes controlling access to certain predefined operational interfaces and types of predefined data on the host server based on its actual location.

20. The process of claim 18, further comprising, preventing unauthorized access to the host server by the remote client based on locations where access is not likely to occur by the remote client.

* * * * *